(12) United States Patent
Kozu et al.

(10) Patent No.: US 7,682,716 B2
(45) Date of Patent: Mar. 23, 2010

(54) METHOD FOR OPERATING FUEL CELL AND FUEL CELL SYSTEM

(75) Inventors: Katsumi Kozu, Sanda (JP); Toshihiko Ichinose, Nara (JP); Masahiro Takada, Shizuoka (JP); Satoshi Shibutani, Hirakata (JP)

(73) Assignee: Panasonic Corporation, Osaka (JP)

( * ) Notice: Subject to any disclaimer, the term of this patent is extended or adjusted under 35 U.S.C. 154(b) by 739 days.

(21) Appl. No.: 10/872,584

(22) Filed: Jun. 21, 2004

(65) Prior Publication Data
US 2004/0265655 A1    Dec. 30, 2004

(30) Foreign Application Priority Data
Jun. 30, 2003    (JP)    ............................. 2003-186852

(51) Int. Cl.
*H01M 8/04* (2006.01)
*H01M 8/10* (2006.01)

(52) U.S. Cl. ..................................................... 429/13
(58) Field of Classification Search .................. 429/13, 429/14, 23
See application file for complete search history.

(56) References Cited

U.S. PATENT DOCUMENTS

| 4,810,597 | A | * | 3/1989 | Kumagai et al. | ............... 429/22 |
| 5,573,866 | A | * | 11/1996 | Van Dine et al. | .............. 429/13 |
| 2002/0086193 | A1 | * | 7/2002 | Acker et al. | ................... 429/22 |
| 2004/0247954 | A1 | * | 12/2004 | Ohler et al. | .................... 429/13 |

FOREIGN PATENT DOCUMENTS

| EP | 1280218 A1 | * | 1/2003 |
| JP | 45-034742 |   | 11/1970 |
| JP | 2002-216832 |   | 8/2002 |
| JP | 2003-022830 |   | 1/2003 |
| JP | 2003-132924 |   | 5/2003 |

* cited by examiner

*Primary Examiner*—Gregg Cantelmo
(74) *Attorney, Agent, or Firm*—Jordan and Hamburg LLP (57) ABSTRACT

A method for operating a direct methanol fuel cell is provided. The fuel cell includes a fuel cell main body having a fuel electrode and an air electrode disposed in opposing positions on either side of an electrolyte film. In this method, an aqueous methanol solution is supplied directly to the fuel electrode. A quantity of the aqueous methanol solution supplied is controlled in accordance with an electric current value drawn from the fuel cell main body so as to minimize a quantity of unused methanol within a discharge fluid discharged from the fuel electrode.

8 Claims, 6 Drawing Sheets

METHOD FOR OPERATING FUEL CELL AND FUEL CELL SYSTEM

The present disclosure relates to subject matter contained in priority Japanese Patent Application No. 2003-186852, filed on Jun. 30, 2003, the contents of which is herein expressly incorporated by reference in its entirety.

BACKGROUND OF THE INVENTION

1. Field of the Invention

The present invention relates to a fuel cell, and more particularly to a method for operating a direct methanol fuel cell in which an aqueous methanol solution is supplied directly to the fuel electrode of the fuel cell main body, and a fuel cell system.

2. Description of the Related Art

In recent years, increased awareness of environmental issues and energy concerns have prompted considerable interest in fuel cells, and fuel cells are already in use as the driving power supply for some vehicles and as domestic cogeneration systems.

Furthermore, direct methanol fuel cells, which can be reduced in size due to the fact that the methanol fuel is supplied directly to the fuel electrode in the form of an aqueous methanol solution, with no requirement for reforming or gasification, have also been proposed as potential power supplies for small, portable electronic equipment (see Japanese Patent Laid-Open Publication No. 2003-132924).

Figure 8:
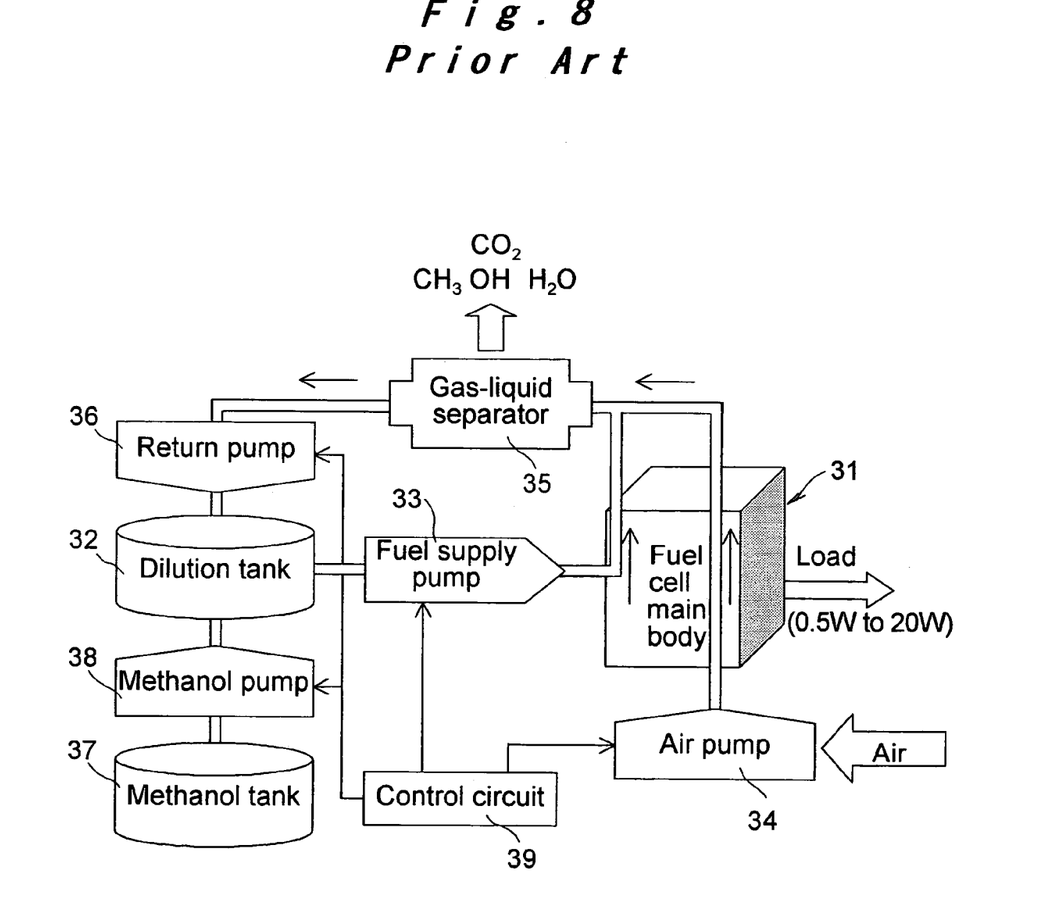
FIG. 8 is a schematic illustration of a conventional fuel cell system.

An example of a conventional fuel cell system of this type is shown in FIG. 8. In FIG. 8, the fuel cell system includes a fuel cell main body 31, a dilution tank 32, a fuel supply pump 33, an air pump 34, a gas-liquid separator 35, a return pump 36, a methanol tank 37, a methanol pump 38, and a control circuit 39. The fuel cell main body 31 includes a fuel electrode (a negative electrode) to which an aqueous methanol solution is supplied on one side of an electrolyte film formed from a proton conductive polymer film, and an air electrode (a positive electrode) to which air containing oxygen is supplied on the other side of the electrolyte film. The dilution tank 32 stores the methanol as an aqueous methanol solution with a concentration of 1 to 20%, for example 5%. The fuel supply pump 33 supplies the aqueous methanol solution from the dilution tank 32 to the fuel electrode of the fuel cell main body 31. The air pump 34 supplies air to the air electrode of the fuel cell main body 31. The gas-liquid separator 35 separates carbon dioxide, and gasified methanol and water from the discharge fluids discharged from the fuel electrode and the air electrode and then discharges them externally. The return pump 36 returns generated water and unused methanol to the dilution tank 32. The methanol tank 37 stores the raw material methanol at a concentration of several tens to 100%. The methanol pump 38 supplies methanol from the methanol tank 37 to the dilution tank 32 so as to achieve a predetermined concentration within the dilution tank 32. The control circuit 39 controls each of the above pumps 33, 34, 36, and 38. A large quantity of the aqueous methanol solution is supplied to the fuel electrode of the fuel cell main body 31, in order to prevent reductions in the concentration of the aqueous methanol solution in the vicinity of the discharge port of the fuel electrode, and the unused methanol is then reused.

Furthermore, in addition to the above type of closed-type fuel cell system, fuel cell systems have also been known in which a recovery and storage section is incorporated within the fuel tank section used for housing the fuel, and specific products such as water are separated and recovered from the discharge fluid from the fuel cell main body and then stored in this recovery and storage section in order to prevent these products from being discharged outside the fuel cell and causing damage to neighboring equipment (see Japanese Patent Laid-Open Publication No. 2002-216832).

However, in the closed-type fuel cell system shown in FIG. 8, because a large proportion of the methanol supplied to the fuel electrode of the fuel cell main body 31 remains as unused methanol, which must be recycled from the discharge port of the fuel electrode and passed through the gas-liquid separator 35, completely preventing the external discharge of methanol that has vaporized in the gas-liquid separator 35 is impossible, and some harmful methanol is discharged externally.

What is worse, a portion of the methanol supplied to the fuel electrode penetrates the electrolyte film (cross leak) and is burnt at the air electrode. Consequently, in these systems the combined quantity of methanol either discharged externally from the gas-liquid separator 35 or cross leaked and subsequently burnt is considerable, meaning the fuel efficiency is poor.

According to tests using a specific closed-type fuel cell system, when a 5 wt % aqueous methanol solution was supplied at a flow rate of 2 cc/minute, and a power level of 0.5 to 20 W was output, the concentration of the aqueous methanol solution at the fuel electrode discharge port fell to a value of 3 to 5 wt %. If the quantity of methanol supplied in this state is deemed 100%, then the quantity of methanol vaporized and discharged with the exhaust gas is 28%, and the quantity of methanol that undergoes cross leak reaches 36%, meaning only 36% of the methanol is actually contributing to power generation. Of this 36% contributing to power generation, 24% is consumed as heat generation due to resistance loss during reaction, and a mere 12% is converted to electrical energy.

If the fuel cell system with a recovery and storage section disclosed in Japanese Patent Laid-Open Publication No. 2002-216832 is applied to a direct methanol fuel cell, then if a recovery and storage section with a simple, compact construction is employed, preventing external discharge of vaporized methanol during the separation and recovery of the methanol discharged from the fuel electrode is difficult. However, if an attempt is made to recover and store all of the discharged fluid except for water, then a large quantity of fluid must be stored in the recovery and storage section, meaning a compact construction is impossible.

SUMMARY OF THE INVENTION

The present invention takes the above problems into consideration, with an object of providing a method for operating a fuel cell and a fuel cell system, which provide a direct methanol fuel cell which is of a compact construction and offers good fuel efficiency and excellent suppression of external methanol discharge.

Namely, the present invention provides a method for operating a direct methanol fuel cell comprising a fuel cell main body having a fuel electrode and an air electrode disposed in opposing positions on either side of an electrolyte film, in which an aqueous methanol solution is supplied directly to the fuel electrode. In this method, a quantity of the aqueous methanol solution supplied is controlled in accordance with an electric current value drawn from the fuel cell main body so as to minimize a quantity of unused methanol in a discharge fluid discharged from the fuel electrode.

This configuration enables a simple and compact construction in which the aqueous methanol solution is simply supplied to the fuel electrode, and air is simply supplied to the air electrode. Moreover, the quantity of the aqueous methanol solution supplied is controlled in accordance with the electric current value drawn, thus minimizing the quantity of unused methanol discharged from the fuel electrode, and consequently the discharge fluid from the fuel electrode is essentially entirely gas, and because the concentration of methanol in the discharge fluid is extremely low, the fluid can be discharged externally, as is, without any danger of causing damage. Because the quantity of methanol discharged externally is reduced to an extremely low level, and the average concentration of the aqueous methanol solution supplied to the fuel electrode is also reduced, the occurrence of methanol cross leak is minimized, thereby achieving a high level of fuel efficiency.

The present invention also provides a direct methanol fuel cell system comprising: a fuel cell main body having a fuel electrode and an air electrode disposed in opposing positions on either side of an electrolyte film in which an aqueous methanol solution is supplied directly to the fuel electrode; a fuel supply pump for supplying the aqueous methanol solution from a fuel supply section to a supply port of the fuel electrode; and a purifier incorporating a purification catalyst for decomposing unused methanol discharged from a discharge port of the fuel electrode into water and carbon dioxide.

According to this configuration, because the methanol in the fluid discharged from the fuel electrode is broken down into non-toxic water and carbon dioxide through the action of the purification catalyst, this fluid can be discharged externally with no further treatment.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

As follows is a description of an embodiment of a fuel cell system according to the present invention, with reference to FIG. 1 through FIG. 5.

Figure 1:
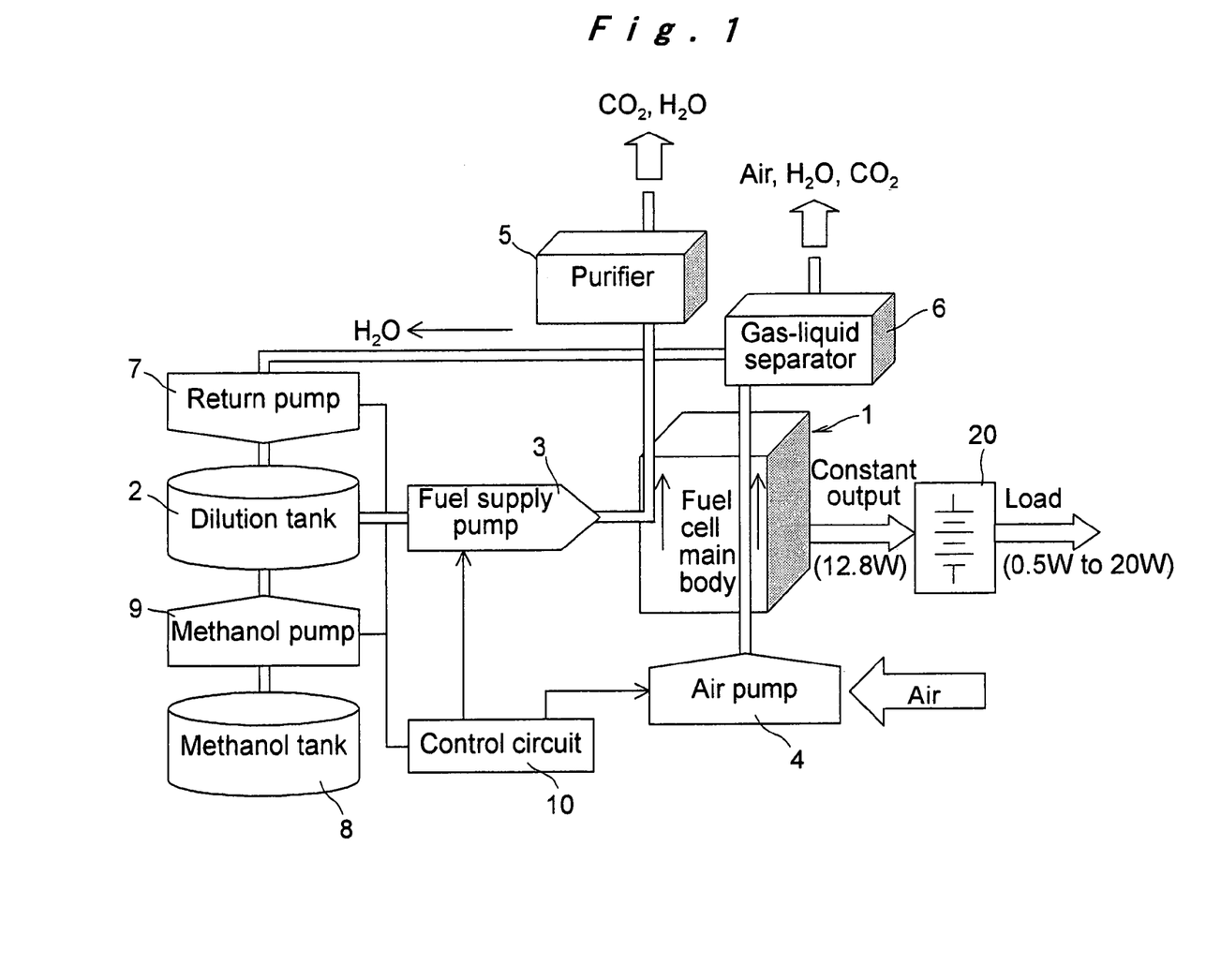
FIG. 1 is a schematic illustration of a fuel cell system according to an embodiment of the present invention.

As shown in FIG. 1, the fuel cell system of this embodiment includes a direct methanol fuel cell main body 1, a dilution tank 2, a fuel supply pump 3, an air pump 4, a purifier 5, a gas-liquid separator 6, a return pump 7, a methanol tank 8, a methanol pump 9, and a control circuit 10. The direct methanol fuel cell main body 1 includes a fuel electrode (a negative electrode) to which an aqueous methanol solution is supplied on one side of an electrolyte film, and an air electrode (a positive electrode) to which air containing oxygen is supplied on the other side of the electrolyte film. The dilution tank 2 stores the methanol as an aqueous methanol solution with a concentration of 2 mol/l (6.4 wt %) for example. The fuel supply pump 3 supplies the aqueous methanol solution from the dilution tank 2 to the fuel electrode of the fuel cell main body 1. The air pump 4 supplies air to the air electrode of the fuel cell main body 1. The purifier 5, incorporating a purification catalyst that decomposes methanol into water and carbon dioxide, purifies a discharge fluid discharged from the fuel electrode and then discharges the purified fluid externally. The gas-liquid separator 6 separates the discharge fluid from the air electrode into a gas component containing air, carbon dioxide and water vapor, and water, and then discharges the gas component externally. The return pump 7 returns the separated water to the dilution tank 2. The methanol tank 8 stores the raw material methanol at a concentration of several tens to 100%, the methanol pump 9 supplies methanol from the methanol tank 8 to the dilution tank 2 so as to achieve a predetermined concentration within the dilution tank 2. The control circuit 10 controls each of the above pumps 3, 4, 7, and 9.

If an aqueous methanol solution with a concentration of 2 mol/l (6.4 wt %) is supplied at a flow rate of 0.3 cc/minute to the fuel electrode of the fuel cell main body 1, then as will be described below in further detail, a constant power level of 3.2 V×4 A (=12.8 W) is output. In the fuel cell system of this embodiment, the power drawn from the fuel cell main body 1 is used to charge a load fluctuation absorption device 20 such as a rechargeable battery, and power is supplied to a load that fluctuates from 0.5 to 20 W via this load fluctuation absorption device 20.

Figure 2:
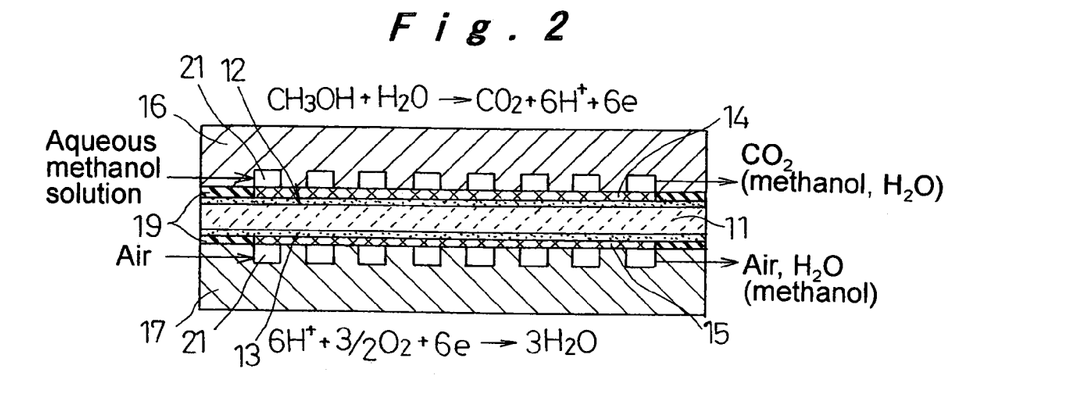
FIG. 2 is a cross-sectional view showing the construction of a unit cell of a fuel cell main body in the same embodiment.

As shown in FIG. 2, the fuel cell main body 1 includes a unit cell in which a fuel electrode 12 formed from a thin layer of carbon particles with fine particles of a predetermined catalyst adhered onto the surface, and an air electrode 13 formed from a thin layer of carbon particles with a predetermined catalyst adhered onto the surface are disposed on opposing sides of an electrolyte film 11 formed from a proton conductive polymer film. Fluid dispersion and current collecting layers 14, 15 are disposed on the fuel electrode 12 and the air electrode 13 respectively, on the opposite side from the electrolyte film 11 in each case. The fluid dispersion and current collecting layers 14 and 15 are each formed from a nonwoven fabric of carbon fiber, so as to disperse the aqueous methanol solution and air equally to the fuel electrode 12 and the air electrode 13, and smoothly collect the electrons generated by reaction. Conductive separators 16, 17 formed from carbon sheet or the like are provided on the outside surface of the fluid dispersion and current collecting layers 14, 15, and contain fluid passages for the aqueous methanol solution or air formed in the surface that faces the fluid dispersion and current collecting layer 14 or 15 respectively. A gasket layer 19 filled with a sealing agent is formed at the outer periphery of the fluid dispersion and current collecting layers 14, 15 to prevent leakage of the aqueous methanol solution or air from the space between the electrolyte film 11 and the separators 16, 17.

Figure 3:
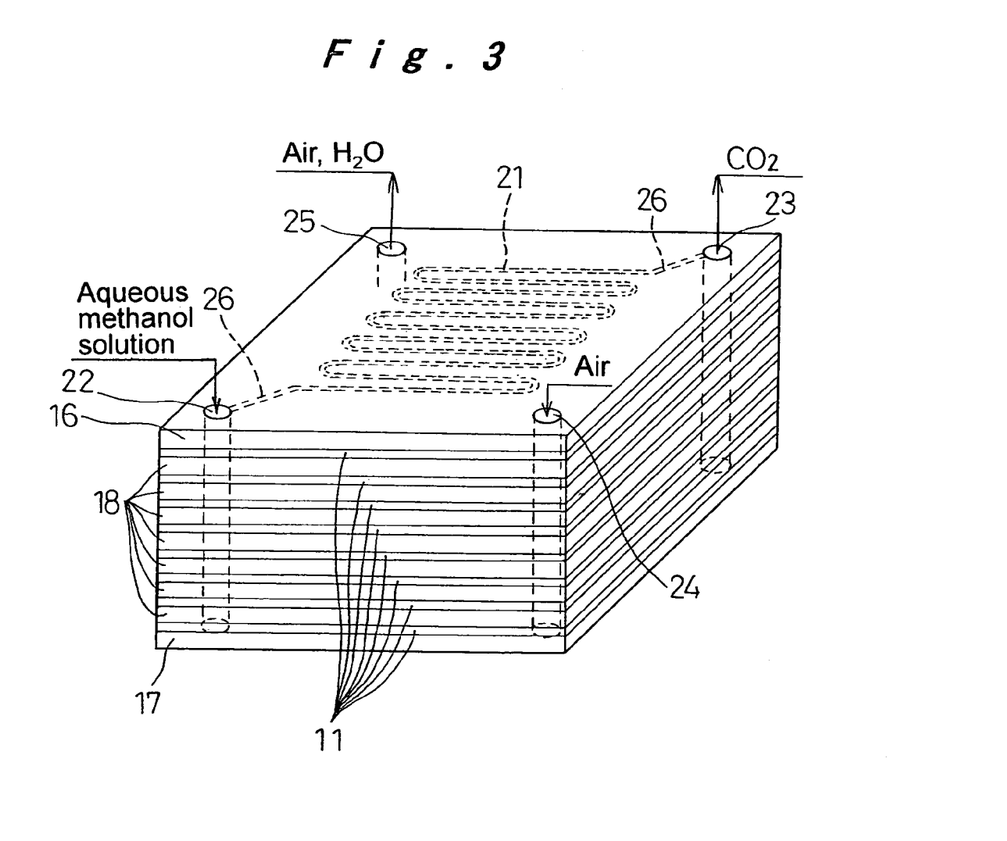
FIG. 3 is a perspective view showing a schematic illustration of the fuel cell main body in the embodiment.

As shown in FIG. 3, the fuel cell main body 1 has eight of these unit cells, each including an electrolyte film 11, a fuel electrode 12, and an air electrode 13, layered on top of one another, and the internal cells utilize common separators 18 which contain fluid passages for the aqueous methanol solution or air formed in both surfaces. As described below in further detail, the fuel cell main body 1 is able to generate an output voltage of 0.4 V for each cell, enabling a total output voltage of 0.4 V×8=3.2 V.

Snaking fluid passages 21 for circulating the aqueous methanol solution or air are formed in the surfaces of the separators 16, 17, 18 that contact the fluid dispersion and current collecting layers 14, 15, and these fluid passages snake back and forth across the entire surface inside the gasket layer 19. Furthermore, a fuel supply port 22 for supplying the aqueous methanol solution to the fuel electrode 12, and a fuel-side discharge port 23 for discharging fluids such as the generated carbon dioxide are formed at one set of opposing corners of the rectangular shaped separators 16, 17, 18, and an air supply port 24 for supplying air to the air electrode 13, and an air-side discharge port 25 for discharging generated water and the like are formed at the other set of opposing corners. The two ends of the fluid passages 21 for circulating the aqueous methanol solution or air are connected to the fuel supply port 22 and fuel-side discharge port 23, or to the air supply port 24 and air-side discharge port 25 respectively, via diagonal connection passages 26.

In the fuel cell system of the above construction, the aqueous methanol solution is supplied to the fuel electrode 12 of the fuel cell main body 1 by the fuel supply pump 3, and air is supplied to the air electrode 13 by the air pump 4. As shown in FIG. 2, methanol and water undergo a reaction at the fuel electrode 12, generating carbon dioxide, hydrogen ions, and electrons, and these hydrogen ions migrate through the electrolyte film 11 to the air electrode 13, where they undergo reaction with oxygen and electrons to generate water. By drawing the electrons generated at the fuel electrode 12 through the fluid dispersion and current collecting layer 14 and the separator 16, and then sending them to the air electrode 13 through the separator 17 and the fluid dispersion and current collecting layer 15, an output current is drawn between the separators 16, 17.

Figure 4:
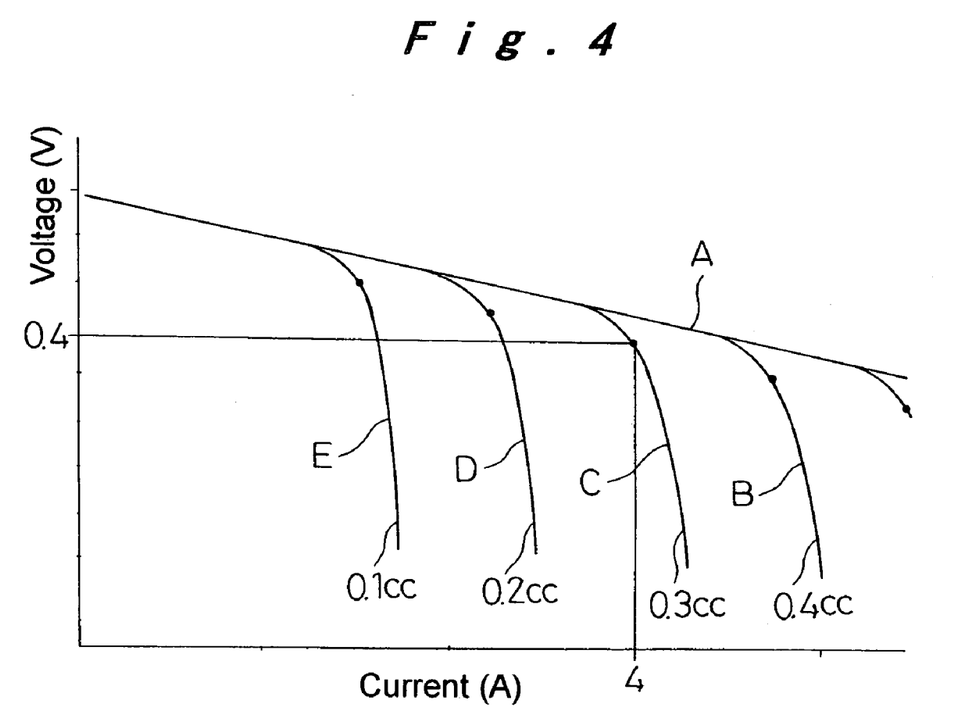
FIG. 4 is a graph showing the voltage versus current characteristics for power generation by the fuel cell main body of the embodiment.
Figure 5:
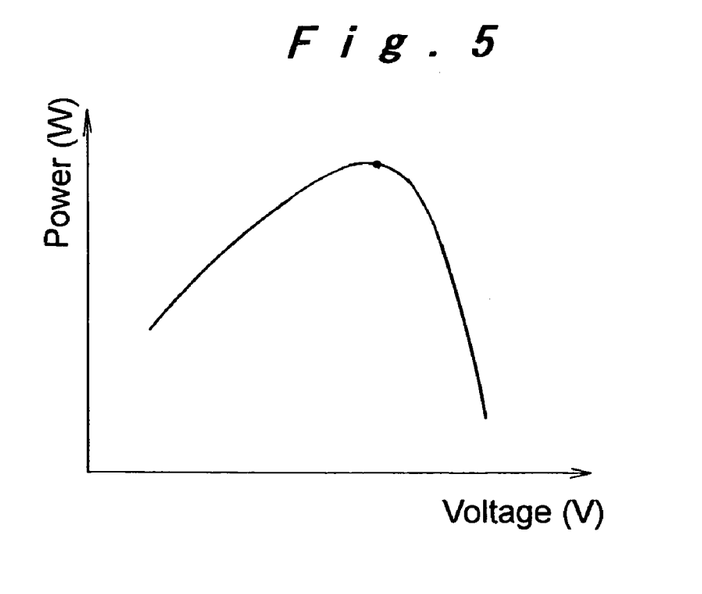
FIG. 5 is a graph showing the power versus voltage characteristic for the fuel cell main body of the embodiment.

As shown in FIG. 4, if the aqueous methanol solution is supplied to this fuel cell main body 1 in sufficient quantity that there is always a large quantity of unused methanol, in a similar manner to that employed with a closed-type fuel cell system, then as the current drawn increases the output voltage gradually decreases, as shown by the characteristic curve A. If the quantity of aqueous methanol solution supplied is reduced, then the resulting curve is essentially the same as the characteristic curve A, up until a point near a predetermined current value that corresponds with that particular supply volume. Once that predetermined current value corresponding with the supply volume is reached, the voltage drops rapidly as indicated by the characteristic curves B to E. Furthermore, in terms of the quantity of power that can be drawn from the system at a specified aqueous methanol solution supply rate, the maximum power output is achieved at a voltage slightly lower than the maximum voltage value, as shown in FIG. 5.

Accordingly, in the present embodiment, an aqueous methanol solution with a concentration of 2 mol/l is supplied at a flow rate of 0.3 cc/minute, as shown by the characteristic curve C, and 4 A of current is drawn from each cell at a voltage of 0.4 V, meaning that a constant power level of 3.2 V×4 A (=12.8 W) is drawn from the entire fuel cell main body 1.

If the supply rate of the aqueous methanol solution is restricted in this manner, to the minimum flow rate capable of generating the required current drawn from the fuel cell main body 1, then the concentration of unused methanol within the discharge fluid from the fuel electrode 12 at a flow rate of 0.15 cc/minute is 0.2 mol/l. If the quantity of supplied methanol is deemed 100%, then the quantity of unused methanol that is discharged is approximately 1 to 5%, with 95 to 99% of the methanol being consumed.

Furthermore, at the fuel-side discharge port 23 of the fuel cell main body 1, the majority of the water from the aqueous methanol solution vaporizes to form water vapor, and this water, the generated carbon dioxide, and the unused methanol passes through the purifier 5 containing the purification catalyst, thereby decomposing the small quantity of unused methanol to water and carbon dioxide, and ensuring that only non-toxic water vapor and carbon dioxide are discharged externally.

In addition, the discharge fluid discharged from the air-side discharge port 25 of the fuel cell main body 1 includes generated water, residual air, and water and carbon dioxide generated by combustion of the methanol that has undergone cross leakage through the electrolyte film 11. The gas-liquid separator 6 separates out the gas-phase water, carbon dioxide and air, and discharges them externally, while the liquid-phase water is returned to the dilution tank 2 by the return pump 7 where it is reused as dilution water for the methanol.

According to tests using this fuel cell system, when an aqueous methanol solution with a concentration of 2 mol/l was supplied to each cell at a flow rate of 0.3 cc/minute, and the eight cells output a combined power of 12.8 W, the concentration of the aqueous methanol solution at the fuel electrode discharge port was 0.2 mol/l. If the quantity of methanol supplied in this state is deemed 100%, then the quantity of methanol vaporized and discharged with the exhaust gas is 2%, and the quantity of methanol that undergoes cross leak is 31%, meaning 67% of the methanol is actually contributing to power generation. Of this 67% contributing to power generation, 45% is consumed as heat generation due to resistance loss during reaction, and the remaining 22% is converted to electrical energy.

According to the fuel cell system of this embodiment, by simply supplying the aqueous methanol solution to the fuel electrode 12 and air to the air electrode 13 as described above, a simple and compact system is achieved. In addition, by providing a control circuit for controlling the supply rate of the aqueous methanol solution in accordance with the electric current value drawn from the fuel cell main body, the quantity of unused methanol discharged from the fuel electrode 12 is suppressed to a minimum, and consequently the discharge fluid from the fuel electrode 12 is essentially entirely gas, and because the concentration of methanol within this fluid is extremely low, it can be discharged externally, as is, without any danger of causing damage. Because the quantity of methanol discharged externally is reduced to an extremely low level, and the average concentration of the aqueous methanol solution supplied to the fuel electrode is also reduced, the occurrence of methanol cross leak is minimized, enabling a high level of fuel efficiency to be achieved.

In addition, because the methanol contained within the discharge fluid discharged from the fuel electrode 12 is broken down into non-toxic water and carbon dioxide by the purification catalyst within the purifier 5 before being discharged externally, any external discharge of methanol is prevented.

Furthermore, because water is separated from the discharge fluid from the air electrode 13 using the gas-liquid separator 6, and this separated water is then returned to the dilution tank 2 using the return pump 7, water is not discharged externally, meaning the system is ideal as a power supply for portable electronic equipment.

Figure 6:
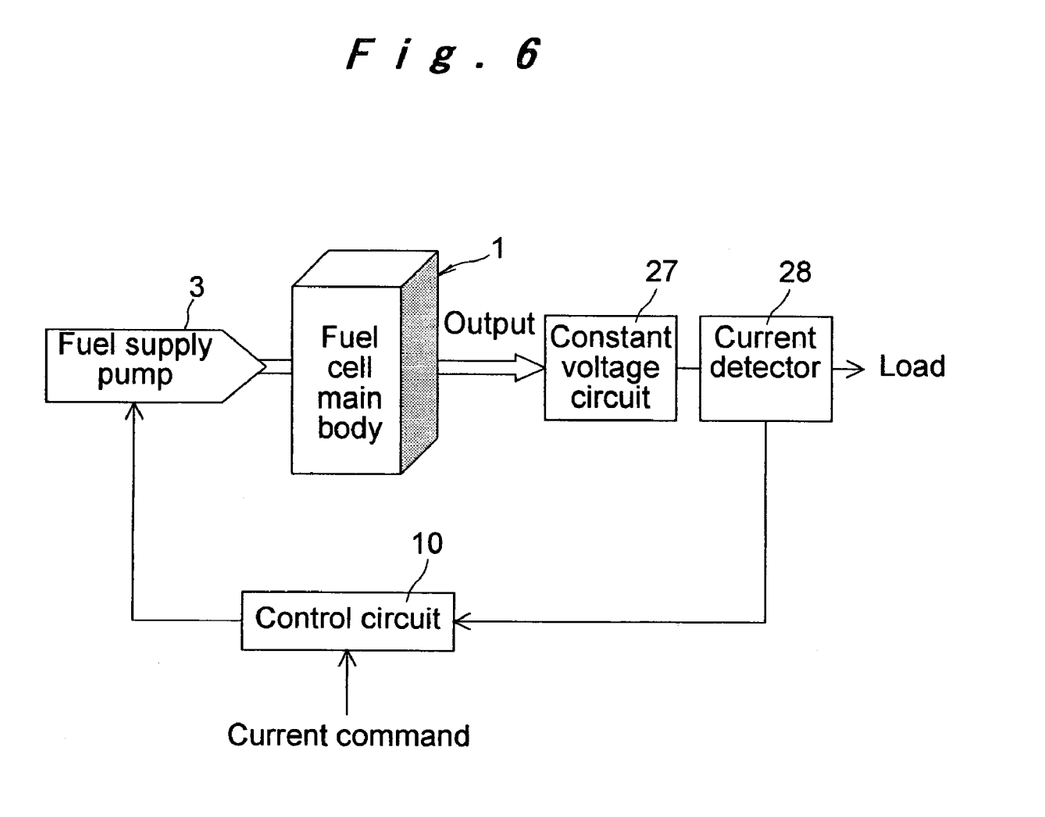
FIG. 6 is a schematic illustration of the essential elements of a fuel cell system according to another embodiment of the invention.

In the description of the above embodiment, the control circuit 10 is used to control the fuel supply pump 3 to restrict the quantity of aqueous methanol solution supplied to the fuel cell main body 1 to a minimum constant volume, and enable a constant power to be drawn from the fuel cell main body 1. However, as shown in FIG. 6, a configuration can also be used in which the output from the fuel cell main body 1 is supplied to the load at a constant voltage generated by a constant voltage circuit 27, the current is detected by a current detector 28, this detected current value and a command current value are input into the control circuit 10, and the fuel supply pump 3 is controlled by the control circuit 10 to supply the fuel cell main body 1 with the minimum quantity of aqueous methanol solution in accordance with the command current value.

Figure 7:
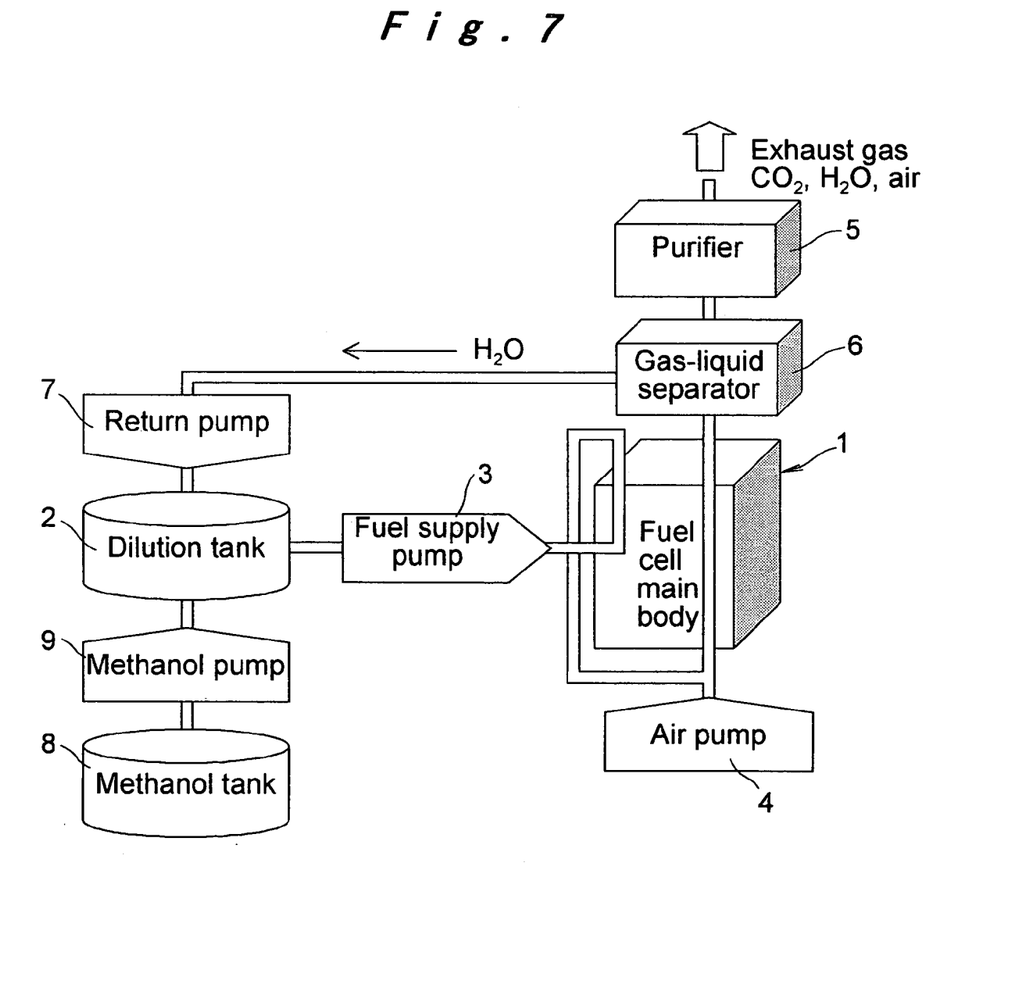
FIG. 7 is a schematic illustration of the essential elements of a fuel cell system according to yet another embodiment of the invention.

Furthermore, in each of the embodiments described above, systems are described in which the discharge fluid discharged from the fuel-side discharge port 23 is passed through the purifier 5 before being discharged externally. However, as shown in FIG. 7, a configuration can also be used in which the fluid discharged from the fuel electrode 12 is mixed with the air being directed towards the air electrode 13 by the air pump 4, and is subsequently supplied to the air electrode 13, so that the unused methanol discharged from the fuel electrode 12 is decomposed by combustion at the air electrode 13. In such a case, the purifier 5 is positioned at the external discharge port of the gas-liquid separator 6, which separates the fluid discharged from the air-side discharge port 25 into a gas component and water. In this configuration, methanol discharge can be suppressed even without the purifier 5, and in some cases the purifier 5 may be omitted entirely.

According to this configuration, the bulk of the unused methanol is decomposed by combustion, and consequently even a purifier 5 with minimal processing capability is able to reliably prevent any external methanol discharge.

In each of the embodiments described above, no particular restrictions are placed on the installation of the purifier 5, and the purifier 5 may be either positioned in close vicinity to the fuel cell main body 1, or may be thermally coupled to the fuel cell main body 1 via a heat transfer member. Consequently, during startup or idling, a larger quantity of fuel than that used during normal operation can be supplied, and by burning the resulting larger quantity of unused fuel in the purifier 5, the heat generated by the combustion can be used for either rapidly heating the fuel cell main body 1 to the temperature with the most favorable operating characteristics, or maintaining the fuel cell main body 1 at that temperature, thereby improving the operating characteristics of the system.

In the method for operating a fuel cell according to the present invention, by controlling the methanol supply rate in accordance with the electric current value drawn from the fuel cell main body, thereby suppressing the quantity of unused methanol discharged from the fuel electrode to a minimum, the methanol concentration within the discharge fluid from the fuel electrode is reduced to an extremely low level, and even if this fluid is discharged externally with no further treatment, there is no danger of causing damage. Because the quantity of methanol discharged externally is reduced to an extremely low level, and the average concentration of the aqueous methanol solution supplied to the fuel electrode is also reduced, the occurrence of methanol cross leak is minimized, thereby achieving a high level of fuel efficiency. Furthermore, because the aqueous methanol solution is simply supplied to the fuel electrode, and air is simply supplied to the air electrode, a simple and compact system is produced.

Furthermore, the fuel cell system according to the present invention includes a fuel supply pump for supplying the aqueous methanol solution from the fuel supply section to a supply port of the fuel electrode, and the purifier incorporating a purification catalyst for decomposing unused methanol discharged from a discharge port of the fuel electrode into water and carbon dioxide, and consequently the methanol within the fluid discharged from the fuel electrode is broken down into non-toxic water and carbon dioxide through the action of the catalyst, meaning the discharge fluid can be discharged externally with no further treatment.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method for operating a direct methanol fuel cell comprising a fuel cell main body comprising a fuel electrode and an air electrode disposed in opposing positions on either side of an electrolyte film, in which an aqueous methanol solution is supplied directly to the fuel electrode, the method comprising:
   controlling a quantity of the aqueous methanol solution supplied in accordance with an electric current value drawn by a load from the fuel cell main body so as to minimize a quantity of unused methanol in a discharge fluid discharged from the fuel electrode;
   decomposing the methanol in the discharge fluid discharged from the fuel electrode into water and carbon dioxide with a catalyst in a purifier external to the fuel cell main body; and
   discharging from the purifier the water and the carbon dioxide.

2. A method for operating a direct methanol fuel cell comprising a fuel cell main body comprising a fuel electrode and an air electrode disposed in opposing positions on either side of an electrolyte film, in which an aqueous methanol solution is supplied directly to the fuel electrode, the method comprising:
   controlling a quantity of the aqueous methanol solution supplied in accordance with an electric current value drawn by a load from the fuel cell main body so as to minimize a quantity of unused methanol in a discharge fluid discharged from the fuel electrode; and
   mixing the discharge fluid discharged from the fuel electrode with air being directed toward the air electrode.

3. The method for operating a fuel cell according to claim 2, further comprising
   performing a gas-liquid separation in a gas-liquid separator on a discharge fluid discharged from the air electrode;
   decomposing methanol in a gas phase into water and carbon dioxide using a catalyst in a purifier external to the fuel cell main body; and
   discharging the water that is in a gaseous state and the carbon dioxide externally.

4. The method for operating a fuel cell according to claim 3, further comprising
   returning water from the gas-liquid separator that is in a liquid state to a dilution tank as a function of the electric current value drawn by the load from the fuel cell.

5. A method for operating a direct methanol fuel cell comprising a fuel cell main body comprising a fuel electrode and an air electrode disposed in opposing positions on either side of an electrolyte film, in which an aqueous methanol solution is supplied directly to the fuel electrode, the method comprising:
   measuring an electric current from the fuel cell main body to a load;
   controlling a quantity of the aqueous methanol solution supplied in accordance with the electric current value drawn by the load from the fuel cell main body so as to minimize a quantity of unused methanol in a discharge fluid discharged from the fuel electrode;
   decomposing the methanol in the discharge fluid discharged from the fuel electrode into water and carbon dioxide with a catalyst in a purifier external to the fuel cell main body; and
   discharging from the purifier the water and the carbon dioxide.

6. A method for operating a direct methanol fuel cell comprising a fuel cell main body comprising a fuel electrode and an air electrode disposed in opposing positions on either side of an electrolyte film, in which an aqueous methanol solution is supplied directly to the fuel electrode, the method comprising:

measuring an electric current from the fuel cell main body to a load;

controlling a quantity of the aqueous methanol solution supplied in accordance with the electric current value drawn by the load from the fuel cell main body so as to minimize a quantity of unused methanol in a discharge fluid discharged from the fuel electrode; and mixing the discharge fluid discharged from the fuel electrode with air being directed toward the air electrode.

7. The method for operating a fuel cell according to claim 6, further comprising performing a gas-liquid separation in a gas-liquid separator on a discharge fluid discharged from the air electrode;

decomposing methanol in a gas phase into water and carbon dioxide using a catalyst in a purifier external to the fuel cell main body; and discharging the water that is in a gaseous state and the carbon dioxide externally.

8. The method for operating a fuel cell according to claim 7, further comprising returning water from the gas-liquid separator that is in a liquid state to a dilution tank as a function of the electric current value drawn by the load from the fuel cell.

* * * * *